United States Patent
Li et al.

(10) Patent No.: US 11,109,441 B2
(45) Date of Patent: Aug. 31, 2021

(54) CONNECTION RELEASE METHOD AND APPARATUS

(71) Applicant: Huawei Technologies Co., Ltd., Shenzhen (CN)

(72) Inventors: Bingzhao Li, Beijing (CN); Wei Quan, Beijing (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/530,401

(22) Filed: Aug. 2, 2019

(65) Prior Publication Data

US 2019/0357299 A1 Nov. 21, 2019

Related U.S. Application Data

(63) Continuation of application No. PCT/CN2017/072863, filed on Feb. 3, 2017.

(51) Int. Cl.
*H04W 76/30* (2018.01)
*H04W 76/27* (2018.01)
(Continued)

(52) U.S. Cl.
CPC ........... *H04W 76/30* (2018.02); *H04W 76/27* (2018.02); *H04W 12/122* (2021.01); *H04W 76/34* (2018.02)

(58) Field of Classification Search
CPC ..... H04W 76/30; H04W 72/04; H04W 76/27; H04W 68/005; H04W 60/00;
(Continued)

(56) References Cited

U.S. PATENT DOCUMENTS

2014/0308953 A1 10/2014 Park et al.
2014/0334389 A1* 11/2014 Abdel-Samad ....... H04W 76/30
370/329
(Continued)

FOREIGN PATENT DOCUMENTS

CN 101577970 A 11/2009
CN 104023376 A 9/2014
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.1.0 (Dec. 2016), 654 pages.
(Continued)

*Primary Examiner* — Nam T Huynh
(74) *Attorney, Agent, or Firm* — Slater Matsil, LLP

(57) ABSTRACT

Embodiments of the present invention provide a connection release method and an apparatus. The connection release method in the present invention includes: generating, by a first access network device, a first message, where the first message includes connection release information for a terminal device and verification information, the verification information is used to verify whether the connection release information is valid, and the connection release information is used to instruct the terminal device to release a connection; and sending, by the first access network device, the first message to a second access network device. According to the embodiments of the present invention, a connection of the terminal device can be released securely and quickly.

8 Claims, 9 Drawing Sheets

(51) Int. Cl.
  *H04W 76/34* (2018.01)
  *H04W 12/122* (2021.01)
(58) Field of Classification Search
  CPC ....... H04W 76/10; H04W 8/08; H04W 68/02; H04W 36/0038; H04W 36/0033
  See application file for complete search history.

(56) References Cited

U.S. PATENT DOCUMENTS

| | | | | |
|---|---|---|---|---|
| 2016/0219554 | A1* | 7/2016 | Khay-Ibbat | H04W 68/02 |
| 2016/0374048 | A1 | 12/2016 | Griot et al. | |
| 2017/0332419 | A1* | 11/2017 | Kim | H04L 1/1861 |
| 2018/0020382 | A1* | 1/2018 | Kim | H04W 72/042 |
| 2019/0349765 | A1* | 11/2019 | Kolekar | H04L 9/0847 |

FOREIGN PATENT DOCUMENTS

| | | |
|---|---|---|
| CN | 104144524 A | 11/2014 |
| CN | 104247553 A | 12/2014 |
| JP | 5386030 B2 | 1/2014 |
| WO | 2018031802 A1 | 2/2018 |

OTHER PUBLICATIONS

3rd Generation Partnership Project; Technical Specification Group Radio Access Network; Evolved Universal Terrestrial Radio Access Network (E-UTRAN); S1 Application Protocol (S1AP) (Release 14), 3GPP TS 36.413 V14.1.0 (Jan. 2017), 333 pages.

Huawei, "S1 impacts for Light Connection," 3GPP TSG-RAN3 Meeting #93, R3-162160, Sophia-Antipolis, France, Oct. 10-14, 2016, 3 pages.

Huawei, et al., "Introduction of light connection in X2AP," 3GPP TSG-RAN WG3 Meeting #94, R3-163124, Reno, Nevada, USA, Nov. 14-18, 2016, 14 pages.

ZTE Corporation, "Discussion on the issue of releasing UE," 3GPP TSG-RAN2 Meeting #96, R2-168201, Reno, Nevada, USA, Nov. 14-18, 2016, 3 pages.

Samsung, "NR RRC state machine, transitions and signalling procedures," 3GPP TSG-RAN WG2 Meeting NR Ad-hoc, R2-1700007, Spokane, USA, Jan. 17-19, 2017, 5 pages.

Nokia, et al., "Paging and location tracking in RRC-Inactive," 3GPP TSG-RAN WG2 Meeting #96, R2-167708, Reno, USA, Nov. 14-18, 2016, 4 pages.

ZTE, et al., "Consideration on the RAN based notification in RRC_Inactive," 3GPP TSG-RAN WG2 NR Ad Hoc, R2-1700277, Spokane, USA, January Jan. 17-19, 2017, 7 pages.

Ericsson (Rapporteur), R2-1700626, Report of email discussion: [96#31][NR]UL data in inactive solution B, 3GPP TSG RAN WG2 #AHS, (Jan. 24, 2017.),total 28 pages.

Catt, R2-164807, Support Data Transmission in Inactive State, 3GPPTSG RAN WG2 #95, (Aug. 13, 2016.),total 9 pages.

Alcatel-Lucent,et al., "RAN 2 evaluation of SA2 Solutions for SDDTE," 3GPP TSG-RAN WG2 Meeting #81bis, Chicago, USA, Apr. 15-19, 2013, R2-131289, 6 pages.

Nokia, et al., "Suspension Options for Mobility out of RAN Paging Area," 3GPP TSG-RAN WG3 Meeting #94, Reno, USA, Nov. 14-18, 2016, R3-162938, 4 pages.

CMCC, "Consideration on security aspect of inactive state," 3GPP TSG-RAN WG2 NR Ad Hoc Spokane, USA, Jan. 17-19, 2017, R2-1700530, 2 pages.

* cited by examiner

CONNECTION RELEASE METHOD AND APPARATUS

CROSS-REFERENCE TO RELATED APPLICATIONS

This application is a continuation of International Application No. PCT/CN2017/072863, filed on Feb. 3, 2017, the disclosure of which is hereby incorporated by reference herein in its entirety.

TECHNICAL FIELD

Embodiments of the present invention relate to communications technologies, and in particular, to a connection release method and an apparatus.

BACKGROUND

When an anchor eNB receives a release request sent by a core network (CN) device or when an anchor eNB determines to release UE, the anchor eNB sends a paging message to the UE. If a paging area is outside a coverage area of the eNB, the anchor eNB also sends the paging message to other eNBs within the paging area, so that the other eNBs send the paging messages to the UE. If the UE feeds back a paging response to one of the eNBs, an eNB that receives the paging response acts as a serving eNB of the UE, and requests a context of the UE from the anchor eNB; then the serving eNB sends a path switch message to the CN device, and the CN device sends a release request message to the serving eNB; and then the serving eNB sends a release instruction to the UE, to release a core network interface of the UE.

In the foregoing process, to release the UE, the eNB that receives the paging response sent by the UE needs to obtain the context of the UE from the anchor eNB and hand over an S1 interface of the UE to the serving eNB, and also needs to recover a radio resource control (RRC) connection for the UE and then send a release instruction to the UE. As a result, it takes a relatively long time for the core network device or the anchor eNB to release the RRC connection of the UE.

SUMMARY

Embodiments of the present invention provide a connection release method and an apparatus, to securely and quickly release a connection of a terminal device.

According to a first aspect, an embodiment of the present invention provides a connection release method, including: generating, by a first access network device, a first message, where the first message includes connection release information for a terminal device and verification information, the verification information is used to verify whether the connection release information is valid, and the connection release information is used to instruct the terminal device to release a connection; and sending, by the first access network device, the first message to a second access network device.

With reference to the first aspect, in a possible implementation of the first aspect, the method further includes: sending, by the first access network device, a lightly connected mode configuration message to the terminal device, where the lightly connected mode configuration message includes identification information and paging area information, and the identification information includes identification information of the terminal device and identification information of the first access network device.

With reference to the first aspect or the possible implementation of the first aspect, in another possible implementation of the first aspect, the method further includes: receiving, by the first access network device, a context information request message sent by the second access network device; and the sending, by the first access network device, the first message to a second access network device includes: sending, by the first access network device, a context information response message to the second access network device, where the context information response message includes the connection release information and the verification information.

With reference to the first aspect or the possible implementation of the first aspect, in another possible implementation of the first aspect, the first message further includes feedback indication information, and the feedback indication information is used to instruct the terminal device to feedback, to the second access network device, whether the connection release information is received.

With reference to the first aspect, in another possible implementation of the first aspect, the sending, by the first access network device, the first message to a second access network device includes: sending, by the first access network device, a paging message to the second access network device, where the paging message includes the connection release information and the verification information.

According to a second aspect, an embodiment of the present invention provides a connection release method, including: generating, by a first access network device, a first message, where the first message includes connection release information for a terminal device and feedback indication information, the feedback indication information is used to instruct the terminal device to feedback, to a second access network device, whether the connection release information is received, and the connection release information is used to instruct the terminal device to release a connection; and sending, by the first access network device, the first message to the second access network device.

With reference to the second aspect, in a possible implementation of the second aspect, the first message further includes verification information, and the verification information is used to verify whether the connection release information is valid.

According to a third aspect, an embodiment of the present invention provides a connection release method, including: receiving, by a second access network device, a first message sent by a first access network device; generating, by a second access network device, a second message, where the second message includes connection release information for a terminal device and verification information, the verification information is used to verify whether the connection release information is valid, and the connection release information is used to instruct the terminal device to release a connection; and sending, by the second access network device, the second message to the terminal device.

With reference to the third aspect, in a possible implementation of the third aspect, the method further includes: receiving, by the second access network device, a radio resource control RRC connection recovery request message sent by the terminal device; sending, by the second access network device, a context information request message to the first access network device based on the RRC connection recovery request message; and the receiving, by a second access network device, a first message sent by a first access network device includes: receiving, by the second access network device, a context information response message sent by the first access network device, where the context information response message includes the connection release information and the verification information.

With reference to the third aspect or the possible implementation of the third aspect, in another possible implementation of the third aspect, the second message further includes feedback indication information, and the feedback indication information is used to instruct the terminal device to feedback whether the connection release information is received.

With reference to the third aspect or the possible implementation of the third aspect, in another possible implementation of the third aspect, the sending, by the second access network device, the second message to the terminal device includes: sending, by the second access network device, a paging message to the terminal device, where the paging message includes the connection release information, the verification information, and the feedback indication information.

According to a fourth aspect, an embodiment of the present invention provides a connection release method, including: receiving, by a second access network device, a first message sent by a first access network device; generating, by the second access network device, a second message, where the second message includes connection release information for a terminal device and feedback indication information, the feedback indication information is used to instruct the terminal device to feedback, to the second access network device, whether the connection release information is received, and the connection release information is used to instruct the terminal device to release a connection; and sending, by the second access network device, the second message to the terminal device.

With reference to the fourth aspect, in a possible implementation of the fourth aspect, the first message further includes verification information, and the verification information is used to verify whether the connection release information is valid.

According to a fifth aspect, an embodiment of the present invention provides a connection release method, including: receiving, by a terminal device, a second message sent by a second access network device, where the second message includes connection release information for the terminal device and verification information, the verification information is used to verify whether the connection release information is valid, and the connection release information is used to instruct the terminal device to release a connection; and determining, by the terminal device based on the verification information, whether the connection release information is valid.

With reference to the fifth aspect, in a possible implementation of the fifth aspect, the method further includes: if the connection release information is valid, releasing, by the terminal device, the connection.

With reference to the fifth aspect or the possible implementation of the fifth aspect, in another possible implementation of the fifth aspect, the second message further includes feedback indication information, and the method further includes: feeding back, by the terminal device to the second access network device based on the feedback indication information, whether the connection release information is received.

With reference to the fifth aspect or the possible implementation of the fifth aspect, in another possible implementation of the fifth aspect, the receiving, by a terminal device, a second message sent by a second access network device includes: receiving, by the terminal device, a paging message sent by the second access network device, where the paging message includes the connection release information and the verification information.

According to a sixth aspect, an embodiment of the present invention provides a connection release method, including: receiving, by a terminal device, a second message sent by a second access network device, where the second message includes connection release information for the terminal device and feedback indication information; and feeding back, by the terminal device to the second access network device based on the feedback indication information, whether the connection release information is received.

With reference to the sixth aspect, in a possible implementation of the sixth aspect, the receiving, by a terminal device, a second message sent by a second access network device includes: receiving, by the terminal device, a paging message sent by the second access network device, where the paging message includes the connection release information and the feedback indication information.

With reference to the sixth aspect or the possible implementation of the sixth aspect, in another possible implementation of the sixth aspect, the feeding back, by the terminal device to the second access network device based on the feedback indication information, whether the connection release information is received includes:

sending, by the terminal device, a connection recovery message to the second access network device, where the connection recovery message is used to feedback, to the second access network device, whether the connection release information is received.

With reference to the sixth aspect or the possible implementation of the sixth aspect, in another possible implementation of the sixth aspect, the sending, by the terminal device, a connection recovery message to the second access network device includes:

the connection recovery message that is sent by the terminal device to the second access network device carries a release instruction, to indicate to the second access network device that the connection recovery message is used to feedback, to the second access network device, that the terminal device receives the connection release information.

According to a seventh aspect, an embodiment of the present invention provides an access network device, including: a processor, configured to generate a first message, where the first message includes connection release information for a terminal device and verification information, the verification information is used to verify whether the connection release information is valid, and the connection release information is used to instruct the terminal device to release a connection; and a transmitter, configured to send the first message to a second access network device.

With reference to the seventh aspect, in a possible implementation of the seventh aspect, the transmitter is further configured to send a lightly connected mode configuration message to the terminal device, where the lightly connected mode configuration message includes identification information and paging area information, and the identification information includes identification information of the terminal device and identification information of the access network device.

With reference to the seventh aspect or the possible implementation of the seventh aspect, in another possible implementation of the seventh aspect, the access network device further includes a receiver, where the receiver is configured to receive a context information request message sent by the second access network device; and the transmitter is specifically configured to send a context information response message to the second access network device, where the context information response message includes the connection release information and the verification information.

With reference to the seventh aspect or the possible implementation of the seventh aspect, in another possible implementation of the seventh aspect, the first message further includes feedback indication information, and the feedback indication information is used to instruct the terminal device to feedback, to the second access network device, whether the connection release information is received.

With reference to the seventh aspect or the possible implementation of the seventh aspect, in another possible implementation of the seventh aspect, the transmitter is specifically configured to send a paging message to the second access network device, where the paging message includes the connection release information and the verification information.

According to an eighth aspect, an embodiment of the present invention provides an access network device, including: a processor, configured to generate a first message, where the first message includes connection release information for a terminal device and feedback indication information, the feedback indication information is used to instruct the terminal device to feedback, to a second access network device, whether the connection release information is received, and the connection release information is used to instruct the terminal device to release a connection; and a transmitter, configured to send the first message to the second access network device.

With reference to the eighth aspect, in a possible implementation of the eighth aspect, the first message further includes verification information, and the verification information is used to verify whether the connection release information is valid.

According to a ninth aspect, an embodiment of the present invention provides an access network device, including: a receiver, configured to receive a first message sent by a first access network device; a processor, configured to generate a second message, where the second message includes connection release information for a terminal device and verification information, the verification information is used to verify whether the connection release information is valid, and the connection release information is used to instruct the terminal device to release a connection; and a transmitter, configured to send the second message to the terminal device.

With reference to the ninth aspect, in a possible implementation of the ninth aspect, the receiver is further configured to receive a radio resource control RRC connection recovery request message sent by the terminal device; the processor is further configured to send, based on the RRC connection recovery request message, a context information request message to the first access network device by using the transmitter; and the receiver is specifically configured to receive a context information response message sent by the first access network device, where the context information response message includes the connection release information and the verification information.

With reference to the ninth aspect or the possible implementation of the ninth aspect, in another possible implementation of the ninth aspect, the second message further includes feedback indication information, and the feedback indication information is used to instruct the terminal device to feedback whether the connection release information is received.

With reference to the ninth aspect or the possible implementation of the ninth aspect, in another possible implementation of the ninth aspect, the transmitter is specifically configured to send a paging message to the terminal device, where the paging message includes the connection release information, the verification information, and the feedback indication information.

According to a tenth aspect, an embodiment of the present invention provides an access network device, including: a receiver, configured to receive a first message sent by a first access network device; a processor, configured to generate a second message, where the second message includes connection release information for a terminal device and feedback indication information, the feedback indication information is used to instruct the terminal device to feedback, to the access network device, whether the connection release information is received, and the connection release information is used to instruct the terminal device to release a connection; and a transmitter, configured to send the second message to the terminal device.

With reference to the tenth aspect, in a possible implementation of the tenth aspect, the first message further includes verification information, and the verification information is used to verify whether the connection release information is valid.

According to an eleventh aspect, an embodiment of the present invention provides a terminal device, including: a receiver, configured to receive a second message sent by a second access network device, where the second message includes connection release information for the terminal device and verification information, the verification information is used to verify whether the connection release information is valid, and the connection release information is used to instruct the terminal device to release a connection; and a processor, configured to determine, based on the verification information, whether the connection release information is valid.

With reference to the eleventh aspect, in a possible implementation of the eleventh aspect, the processor is further configured to: if the connection release information is valid, release the connection.

With reference to the eleventh aspect or the possible implementation of the eleventh aspect, in another possible implementation of the eleventh aspect, the second message further includes feedback indication information, and the processor is further configured to feedback, to the second access network device based on the feedback indication information by using the transmitter, whether the connection release information is received.

With reference to the eleventh aspect or the possible implementation of the eleventh aspect, in another possible implementation of the eleventh aspect, the receiver is specifically configured to receive a paging message sent by the second access network device, where the paging message includes the connection release information and the verification information.

According to a twelfth aspect, an embodiment of the present invention provides a terminal device, including: a receiver, configured to receive a second message sent by a second access network device, where the second message includes connection release information for the terminal device and feedback indication information; and a processor, configured to feedback, to the second access network device based on the feedback indication information by using a transmitter, whether the connection release information is received.

With reference to the twelfth aspect, in a possible implementation of the twelfth aspect, the receiver is specifically configured to:

receive a paging message sent by the second access network device, where the paging message includes the connection release information and the feedback indication information.

According to the connection release method and the apparatus provided in the embodiments of the present invention, when a connection of the terminal device in a lightly connected mode needs to be released, the first access network device generates the first message, where the first message includes the connection release information for the terminal device and the verification information; the first access network device sends the first message to the second access network device; the second access network device generates the second message, where the second message includes the connection release information for the terminal device and the verification information; the second access network device sends the second message to the terminal device; and the terminal device determines, based on the verification information, whether the connection release information is valid; and when the connection release information is valid, the connection of the terminal device is released, so that the connection of the terminal device can be released securely and quickly.

BRIEF DESCRIPTION OF THE DRAWINGS

To describe the technical solutions of the embodiments of the present invention more clearly, the following briefly describes the accompanying drawings required for describing the embodiments.

DETAILED DESCRIPTION OF ILLUSTRATIVE EMBODIMENTS

To make the purpose, technical solutions, and advantages of the embodiments of the present invention more clearly, the following clearly and describes the technical solutions of the embodiments of the present invention with reference to the accompanying drawings in the embodiments of the present invention.

A "lightly connected mode" in the embodiments of the present invention specifically means that a core network interface and connection context information that are of a terminal device are kept in a RAN device. The RAN device is an anchor RAN device of the terminal device, and the anchor RAN device may configure a paging area for the terminal device in a lightly connected mode. When the terminal device in the lightly connected mode changes, within the paging area, a cell in which the terminal device is located, for example, when the terminal device obtains a cell with better signal quality through measurement, the terminal device may perform communication in the cell with better signal quality through cell reselection, without a handover instruction from a network side.

The core network interface of the terminal device in the "lightly connected mode" is anchored on the anchor RAN device, and then the terminal device may perform cell reselection mobility. The terminal device does not need to notify a base station when moving within a predetermined area (the paging area), but needs to notify the base station of a location of the terminal device once the terminal device goes outside the paging area. Such a process may be referred to as a paging area update process.

The "lightly connected mode" may also be referred to as an inactive mode, a deactivated mode, a low active mode, a low overhead mode, a paging mode, or the like. The lightly connected mode may be a sub-mode of an RRC connected mode or an enhanced mode of an idle mode, or may be an independent mode. For example, the terminal in the lightly connected mode may be in the idle mode but stores connection configuration-related context information, or may be in the connected mode but is allowed to perform cell reselection-based mobility.

The paging area in the embodiments of the present invention is specifically a set of cells of a terminal device. However, the embodiments of the present invention are not limited thereto. For example, the set of cells may be alternatively referred to as a registration area of the terminal device, an access network registration area of the terminal device, an access network tracking area, or the like.

Figure 1:
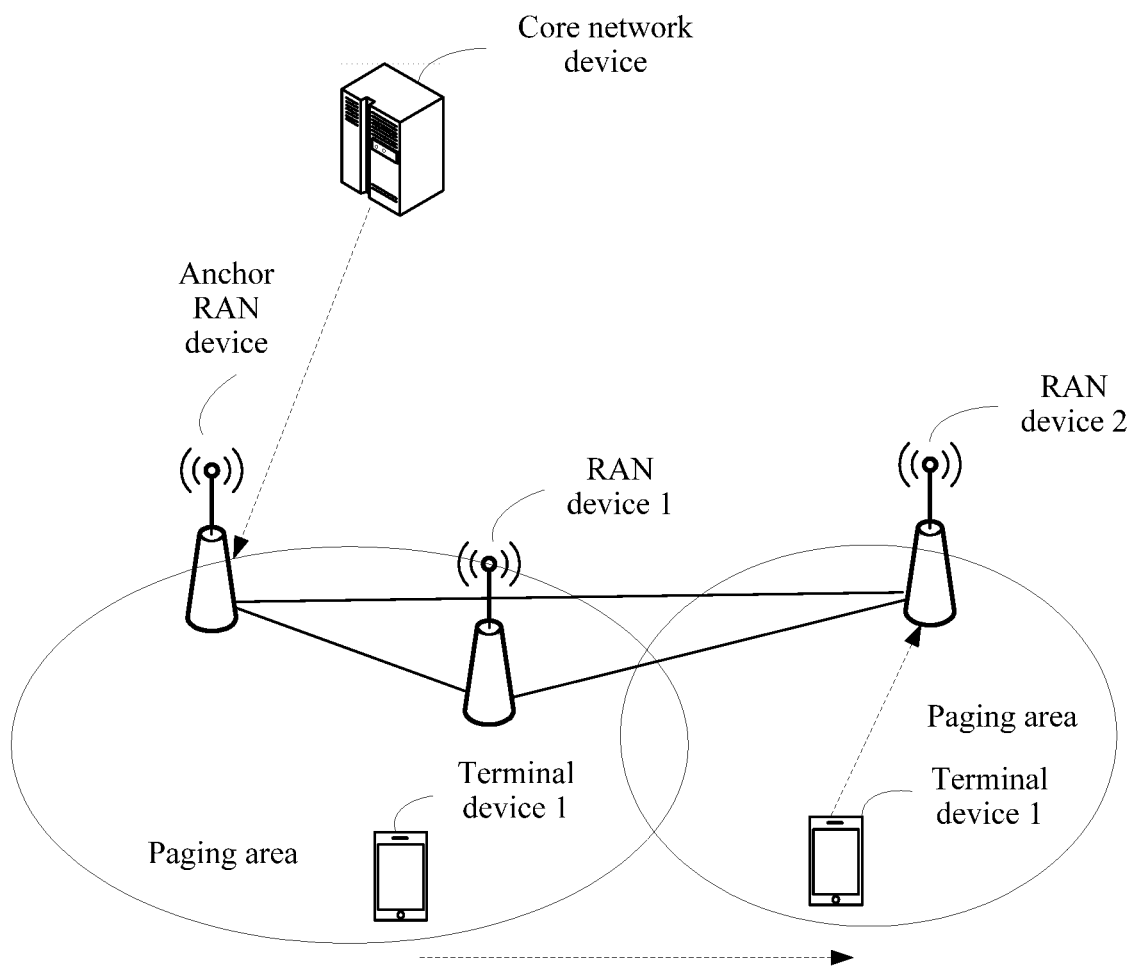
FIG. 1 is a schematic diagram of an application scenario according to an embodiment of the present invention.

FIG. 1 is a schematic diagram of an application scenario according to an embodiment of the present invention. As shown in FIG. 1, the application scenario of this embodiment may include a core network device, a radio access network (RAN) device, and a terminal device. The core network device establishes a connection to the terminal device through the RAN device.

The core network device is specifically corresponding to a different device in a different system. Specifically, the core network device is corresponding to an MME and/or an S-GW in a 4G LTE standard, is corresponding to an SGSN or a GGSN in a 3G UMTS standard, and may be corresponding to an NG-Core in 5G.

The RAN device establishes a connection to the terminal device, receives data from the terminal device, and sends the data to the core network device. The RAN device is corresponding to a different device in a different system. For example, the RAN device is corresponding to a base station and a base station controller in a 2G GSM standard, is corresponding to a base station and a radio network controller (RNC) in a 3G UMTS standard, is corresponding to an eNB in a 4G LTE standard, and is corresponding to a 5G access network device in 5G, such as an NG-NB or a G-NB.

The terminal is specifically a device providing voice and/or data connectivity for a user, and may be a wireless terminal or a wired terminal. The wireless terminal may be a handheld device with a wireless connection function, or another processing device connected to a wireless modem, or may be a mobile terminal that communicates with one or more core networks through a radio access network. For example, the wireless terminal may be a mobile phone (also referred to as a "cellular" phone) and a computer with a mobile terminal. For another example, the wireless terminal may be alternatively a portable, pocket-sized, handheld, computer built-in, or in-vehicle mobile apparatus. For still another example, the wireless terminal may be a part of a mobile station, an access point, user equipment (UE), or the like. The terminal device may provide a communication service for the user by coordinating with a network device (the radio access network device or the core network device).

As shown in FIG. 1, the RAN device may include an anchor RAN device, a RAN device 1, and a RAN device 2. The anchor RAN keeps, in a lightly connected mode, a connection between the terminal device and a core network, and the anchor RAN also stores context information of the terminal device.

As shown in FIG. 1, context information of a terminal device 1 and a CN interface are kept in the anchor RAN device. When the terminal device 1 and the anchor RAN device are located in a same paging area, the terminal device 1 may move arbitrarily within the paging area without notifying any RAN device within the paging area. For example, the terminal device 1 is located in a left paging area shown in FIG. 1. The paging area may include a set of cells managed by one or more RAN devices. When the terminal device 1 and the anchor RAN device are located in different paging areas, for example, when the terminal device 1 shown in FIG. 1 moves into a right paging area in FIG. 1, the terminal device 1 needs to correspondingly change an anchor RAN device after changing the paging area, that is, uses a RAN device 2 shown in FIG. 1 as the anchor RAN device.

Network entities in a connection release method in the embodiments of the present invention may be the core network device, the anchor RAN device, the RAN device 1, and the terminal device 1 that are shown in FIG. 1. When the anchor RAN device or the core network device needs to release a connection of a terminal device in a lightly connected mode, the terminal device securely and quickly releases the connection of the terminal device by using the connection release method in the embodiments of the present invention.

A "first access network device" in the embodiments of the present invention is specifically an access network device storing context information of a terminal device, and may be the anchor RAN device shown in FIG. 1. A "second access network device" in the embodiments is specifically an access network device storing paging area information of the terminal device and identification information that are allocated by the first access network device to the terminal device. The identification information may specifically include identification information of the terminal device and identification information of the first access network device. The second access network device may be the RAN device 1 shown in FIG. 1. In a paging stage, in a paging area in which the terminal device is in the lightly connected mode, all RAN devices except the first access network device are second access network devices. After the terminal device accesses an access network device, a RAN device receiving a paging response from the terminal device is the second access network device.

Figure 2:
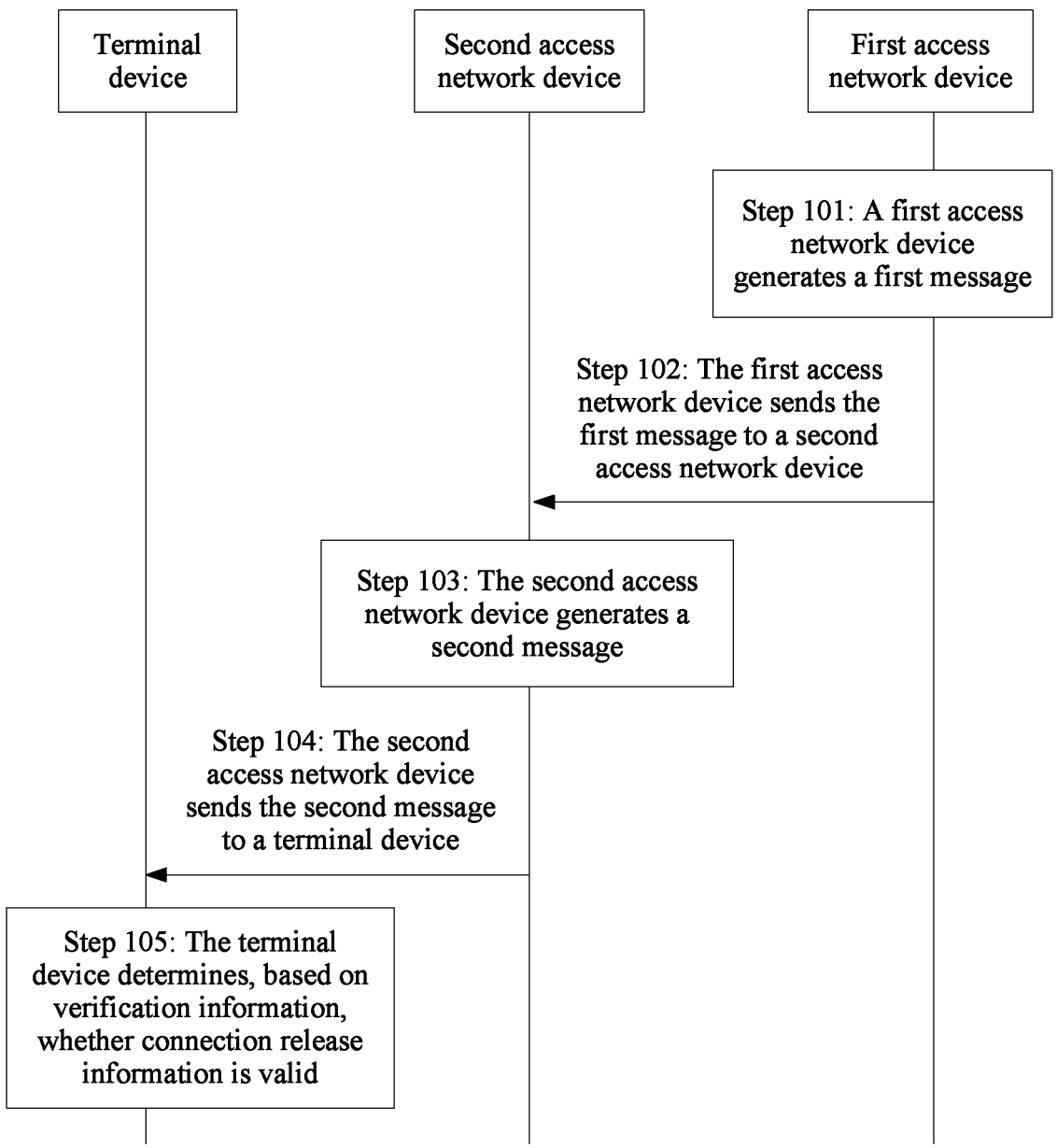
FIG. 2 is a flowchart of a connection release method according to an embodiment of the present invention.

FIG. 2 is a flowchart of a connection release method according to an embodiment of the present invention. As shown in FIG. 2, the method in this embodiment may include the following steps.

Step 101: A first access network device generates a first message.

The first message includes connection release information for a terminal device and verification information, the verification information is used to verify whether the connection release information is valid, and the connection release information is used to instruct the terminal device to release a connection.

Specifically, when the first access network device determines that the connection of the terminal device needs to be released, the first access network device may generate the first message. The verification information is specifically provided to the terminal device, so that the terminal device verifies, based on the verification information, whether a network device (for example, the first access network device in this embodiment) that sends the connection release information is valid. The terminal device performs the verification based on the verification information, so that a security problem caused by an unauthorized network device such as a pseudo base station can be effectively avoided.

For example, when no data is transmitted between the first access network device and the terminal device for quite a long time, the first access network device determines that the connection of the terminal device needs to be released, to improve network resource utilization. Certainly, it can be understood that, a core network device may determine that the connection of the terminal device needs to be released. When the core network device determines that the connection of the terminal device needs to be released, the core network device may send a release instruction message to the first access network device, so that the first access network device generates the first message.

Specifically, the verification information may be generated by the first access network device based on a key of the terminal device and context information of the terminal device. It can be understood that, the verification information may be alternatively generated in another manner. In a feasible implementation, the first access network device may perform an operation on identification information of the terminal device and key information of the terminal device, and use an operation result as the verification information.

Step 102: The first access network device sends the first message to a second access network device.

The second access network device receives the first message sent by the first access network device.

Step 103: The second access network device generates a second message.

The second message includes the connection release information for the terminal device and the verification information, the verification information is used to verify whether the connection release information is valid, and the connection release information is used to instruct the terminal device to release the connection.

Specifically, the connection release information for the terminal device and the verification information included in the first message may be the same as those included in the second message.

Step 104: The second access network device sends the second message to the terminal device.

The terminal device receives the second message sent by the second access network device.

Step 105: The terminal device determines, based on the verification information, whether the connection release information is valid.

If the connection release information is valid, the terminal device releases the connection. The terminal device may specifically release the connection in the following implementation: The terminal device deletes stored connection configuration-related context information, and switches to an idle mode. If the connection release information is invalid, the terminal device discards the connection release information. Specifically, for example, the terminal device performs an operation on an identity of the terminal device and the key of the terminal device, and compares an operation result with the verification information. If the operation result is consistent with the verification information, the connection release information is valid, or if the operation result is inconsistent with the verification information, the connection release information is invalid.

The first access network device sends a lightly connected mode configuration message to the terminal device, where the lightly connected mode configuration message includes identification information and paging area information, and the identification information includes the identification information of the terminal device and identification information of the first access network device.

In an optional implementation, the method may further include: The terminal device sends an RRC connection recovery request message to the second access network device, the second access network device sends a context information request message to the first access network device based on the RRC connection recovery request message, and the first access network device receives the context information request message sent by the second access network device. Correspondingly, step 102 may be specifically implemented as follows: The first access network device sends a context information response message to the second access network device, where the context information response message includes the connection release information and the verification information.

In another optional implementation, step 102 may be specifically implemented as follows: The first access network device sends a paging message to the second access network device, where the paging message includes the connection release information and the verification information. Step 104 may be specifically implemented as follows: The second access network device sends the paging message to the terminal device, where the paging message includes the connection release information and the verification information.

Optionally, the first message further includes feedback indication information, and the feedback indication information is used to instruct the terminal device to feedback, to the first access network device, whether the connection release information is received.

Optionally, the second message further includes feedback indication information, and the feedback indication information is used to instruct the terminal device to feedback, to the second access network device, whether the connection release information is received.

Optionally, the terminal device sends a connection recovery request message to the second access network device, and the connection recovery request message is used to feedback, to the second access network device, whether the connection release information is received.

Optionally, the connection recovery request message that is sent by the terminal device to the second access network device carries a release instruction, to indicate to the second access network device that the connection recovery message is used to feedback, to the second access network device, that the terminal device receives the connection release information.

In this embodiment, when a connection of the terminal device in a lightly connected mode needs to be released, the first access network device generates the first message, where the first message includes the connection release information for the terminal device and the verification information; the first access network device sends the first message to the second access network device; the second access network device generates the second message, where the second message includes the connection release information for the terminal device and the verification information; the second access network device sends the second message to the terminal device; the terminal device determines, based on the verification information, whether the connection release information is valid; and when the connection release information is valid, the connection of the terminal device is released, so that the connection of the terminal device can be released securely and quickly.

The following uses two specific embodiments to describe in detail the technical solution of the method embodiment shown in FIG. 2. An example in which a core network device is an MME is used for description.

Figure 3:
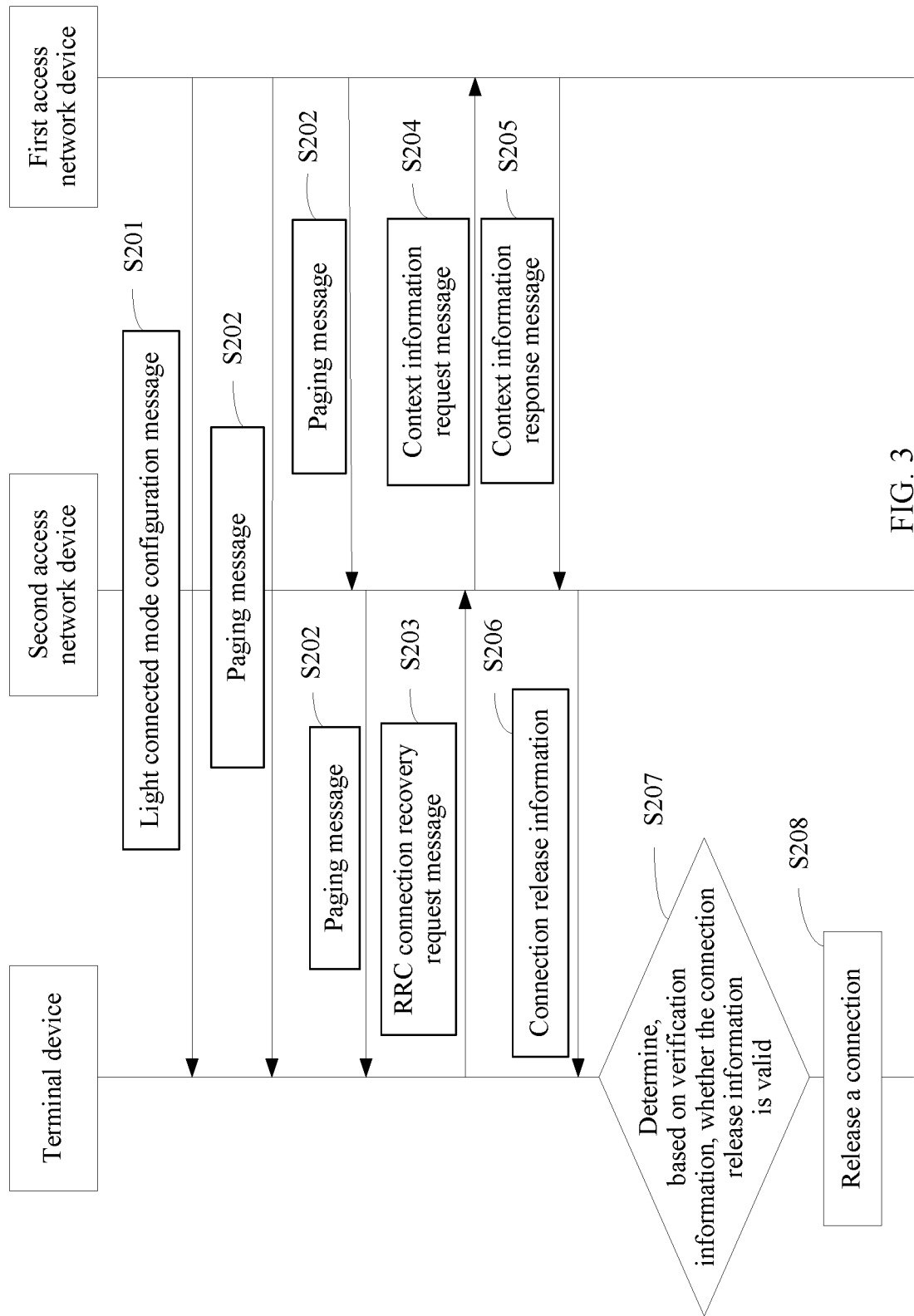
FIG. 3 is a flowchart of a connection release method according to another embodiment of the present invention.

FIG. 3 is a flowchart of a connection release method according to another embodiment of the present invention. In this embodiment, specifically, connection release information and verification information are sent by using a context information response message. As shown in FIG. 3, the method in this embodiment may include the following steps.

S201. A first access network device sends a lightly connected mode configuration message to a terminal device.

The lightly connected mode configuration message includes identification information and paging area information. The identification information includes identification information of the terminal device and identification information of the first access network device.

Specifically, by performing step 201, the first access network device may allocate, to the terminal device, the identification information used by the terminal device in a lightly connected mode and the paging area information, and control the terminal device to enter the lightly connected mode. The terminal device does not need to notify the first access network device when moving within a paging area.

S202. The first access network device sends a paging message.

Specifically, when determining that a connection of the terminal device needs to be released, the first access network device may send the paging message to all access network devices within the paging area.

Specifically, because the first access network device cannot determine a current specific location of the terminal device, the first access network device needs to send, within the paging area, the paging message to the terminal device. If the terminal responds to the paging, an access network device that receives a paging response of the terminal device is a second access network device.

S203. The terminal device sends an RRC connection recovery request message to the second access network device.

Specifically, after receiving the paging message, the terminal device sends the RRC connection recovery request message to the second access network device that sends the paging message. The RRC connection recovery request message may include identification information, and the identification information includes the identification information of the terminal device and the identification information of the first access network device, so that the second access network device recovers the connection for the terminal device based on the identification information. Certainly, it can be understood that, the identification information included in the RRC connection recovery request message may be alternatively respective partial information of the identification information of the terminal device and the identification information of the first access network device, provided that the second access network device can recognize the terminal device and the first access network device based on the identification information.

Optionally, the RRC connection recovery request message may be alternatively an RRC connection continuity message.

S204. The second access network device sends a context information request message to the first access network device.

S205. The first access network device sends the context information response message to the second access network device.

The context information response message includes the connection release information and the verification information. For specific descriptions of the connection release information and the verification information, refer to step 101. Details are not described herein again.

S206. The second access network device sends the connection release information to the terminal device.

The second access network device sends the verification information to the terminal device while sending the connection release information to the terminal device. The connection release information and the verification information may be carried in an RRC connection reject message. Alternatively, the RRC connection reject message implicitly instructs the terminal device to carry the verification information to the terminal device while releasing the connection. Alternatively, the connection release information is an RRC connection release message, and the RRC connection release message carries the verification information.

S207. The terminal device determines, based on the verification information, whether the connection release information is valid, and if the connection release information is valid, performs S208, or if the connection release information is invalid, discards the connection release information.

S208. The terminal device releases the connection.

In this embodiment, when the connection of the terminal device needs to be released, the first access network device sends the paging message; the terminal device responds to the paging message of the second access network device; the terminal device sends the RRC connection recovery request message to the second access network device; the second access network device requests the context information of the terminal device from the first access network device; the first access network device sends the context information response message to the second access network device, where the context information response message includes the connection release information and the verification information; the second access network device sends the RRC connection reject message to the terminal device; and the terminal device determines, based on the verification information, whether the connection release information is valid, and if the connection release information is valid, the terminal device releases the connection. When the terminal device in the lightly connected mode needs to be released, a network side does not need to recover the connection of the terminal device, and therefore the connection can be released securely and quickly.

Figure 4:
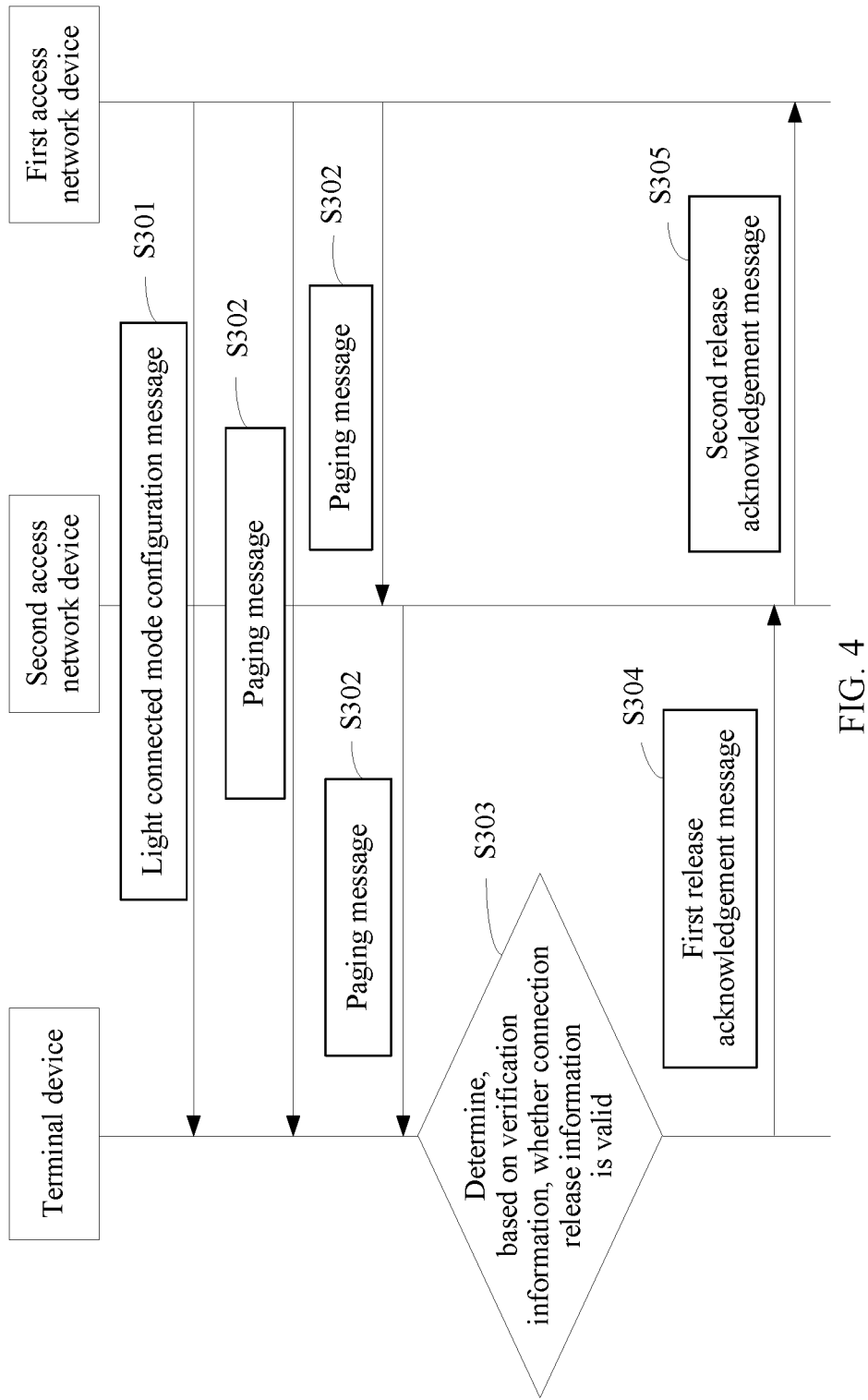
FIG. 4 is a flowchart of a connection release method according to still another embodiment of the present invention.

FIG. 4 is a flowchart of a connection release method according to still another embodiment of the present invention. As shown in FIG. 4, a difference between this embodiment and the embodiment shown in FIG. 3 lies in that, in this embodiment, connection release information and verification information are sent by using a paging message. The method in this embodiment may include the following steps.

S301. A first access network device sends a lightly connected mode configuration message to a terminal device.

For specific descriptions of step 301, refer to step 201. Details are not described herein again.

S302. The first access network device sends the paging message.

Specifically, when determining that a connection of the terminal device needs to be released, the first access network device may send the paging message to all access network devices within a paging area.

Specifically, because the first access network device cannot determine a current specific location of the terminal device, the first access network device needs to send, within the paging area, the paging message to the terminal device. If an access network device within the paging area responds to the paging, the access network device that receives a paging response of the terminal device is a second access network device.

Different from the embodiment shown in FIG. 3, the paging message in step 302 includes the connection release information and the verification information. For specific descriptions of the connection release information and the verification information, refer to the foregoing embodiment. Details are not described herein again. Optionally, the paging message may further include feedback indication information. The feedback indication information is used to instruct the terminal device to feedback, to the first access network device, whether the connection release information is received, so that the first access network device confirms that the terminal device receives the connection release information.

S303. The terminal device determines, based on the verification information, whether the connection release information is valid, and if the connection release information is valid, performs S304.

S304. The terminal device sends a first release acknowledgement message to the second access network device.

The first release acknowledgement message may be sent by using an RRC connection recovery request message.

The RRC connection recovery request message includes identification information, and the identification information includes identification information of the terminal device and identification information of the first access network device.

Further, the connection recovery request message that is sent by the terminal device to the second access network device carries a release instruction, to indicate to the second access network device that the connection recovery request message is used to feedback, to the second access network device, that the terminal device receives the connection release information.

S305. The second access network device sends a second release acknowledgement message to the first access network device.

Specifically, the second access network device receives the identification information sent by the terminal device, confirms that the terminal device receives the paging message carrying the connection release information, and sends the second release acknowledgement message to the first access network device. The first access network device may delete context information of the terminal device based on the second release acknowledgement message, and release a communications interface between the terminal device and a core network device.

After performing S304, the terminal device may release the connection to enter an idle mode.

In an optional implementation, if the paging message carries the feedback indication information, by performing S304 and S305, the terminal device completes feedback and releases the connection. If the paging message does not carry the feedback indication information, the terminal device directly releases the connection after performing S303.

In this embodiment, when the connection of the terminal device needs to be released, the first access network device sends the connection release information and the verification information by using the paging message, the terminal device determines, based on the verification information, whether the connection release information is valid, and if the connection release information is valid, the terminal device releases the connection. When the terminal device in a lightly connected mode needs to be released, a network side does not need to recover the connection of the terminal device, and therefore the connection can be released securely and quickly.

Figure 5:
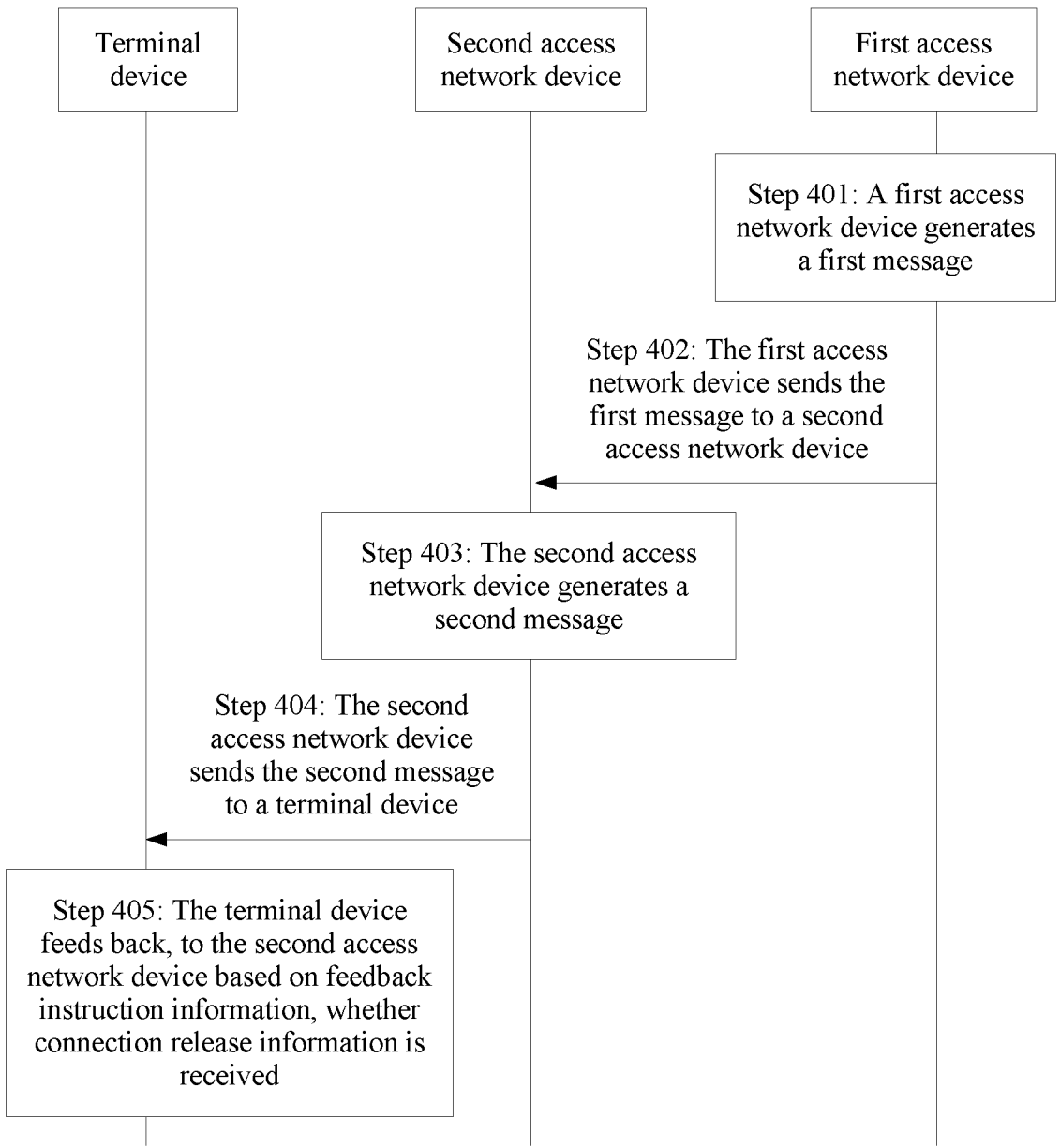
FIG. 5 is a flowchart of a connection release method according to still another embodiment of the present invention.

FIG. 5 is a flowchart of a connection release method according to still another embodiment of the present invention. As shown in FIG. 5, the method in this embodiment may include the following steps.

Step 401: A first access network device generates a first message.

The first message includes connection release information for a terminal device and feedback indication information. The feedback indication information is used to instruct the terminal device to feedback, to a second access network device, whether the connection release information is received, and the connection release information is used to instruct the terminal device to release a connection.

Step 402: The first access network device sends the first message to the second access network device.

Step 403: The second access network device generates a second message.

The second message includes the connection release information for the terminal device and the feedback indication information.

Step 404: The second access network device sends the second message to the terminal device.

Both the first message and the second message may be sent by using a paging message.

Step 405: The terminal device feeds back, to the second access network device based on the feedback indication information, whether the connection release information is received.

Optionally, step 405 may be specifically implemented as follows: The terminal device sends a connection recovery message to the second access network device, where the connection recovery message is used to feedback, to the second access network device, that the terminal device receives the connection release information.

Optionally, that the terminal device sends a connection recovery message to the second access network device may be specifically as follows: The connection recovery message that is sent by the terminal device to the second access network device carries a release instruction, to indicate to the second access network device that the connection recovery message is used to feedback, to the second access network device, that the terminal device receives the connection release information.

Optionally, the first message and the second message in this embodiment may further include verification information. For specific descriptions of the verification information, refer to the descriptions of the embodiments shown in FIG. 2 to FIG. 4. Details are not described herein again.

In this embodiment, when the connection of the terminal device in the lightly connected mode needs to be released, the first access network device generates the first message, where the first message includes the connection release information for the terminal device and the feedback indication information. The first access network device sends the first message to the second access network device, and the second access network device generates the second message, where the second message includes the connection release information for the terminal device and the feedback indication information. The second access network device sends the second message to the terminal device, and the terminal device feeds back, to the second access network device based on the feedback indication information, whether the connection release information is received, so as to securely and quickly release the connection of the terminal device, and also ensure a network side to correctly learn of a current mode of the terminal device.

Figure 6:
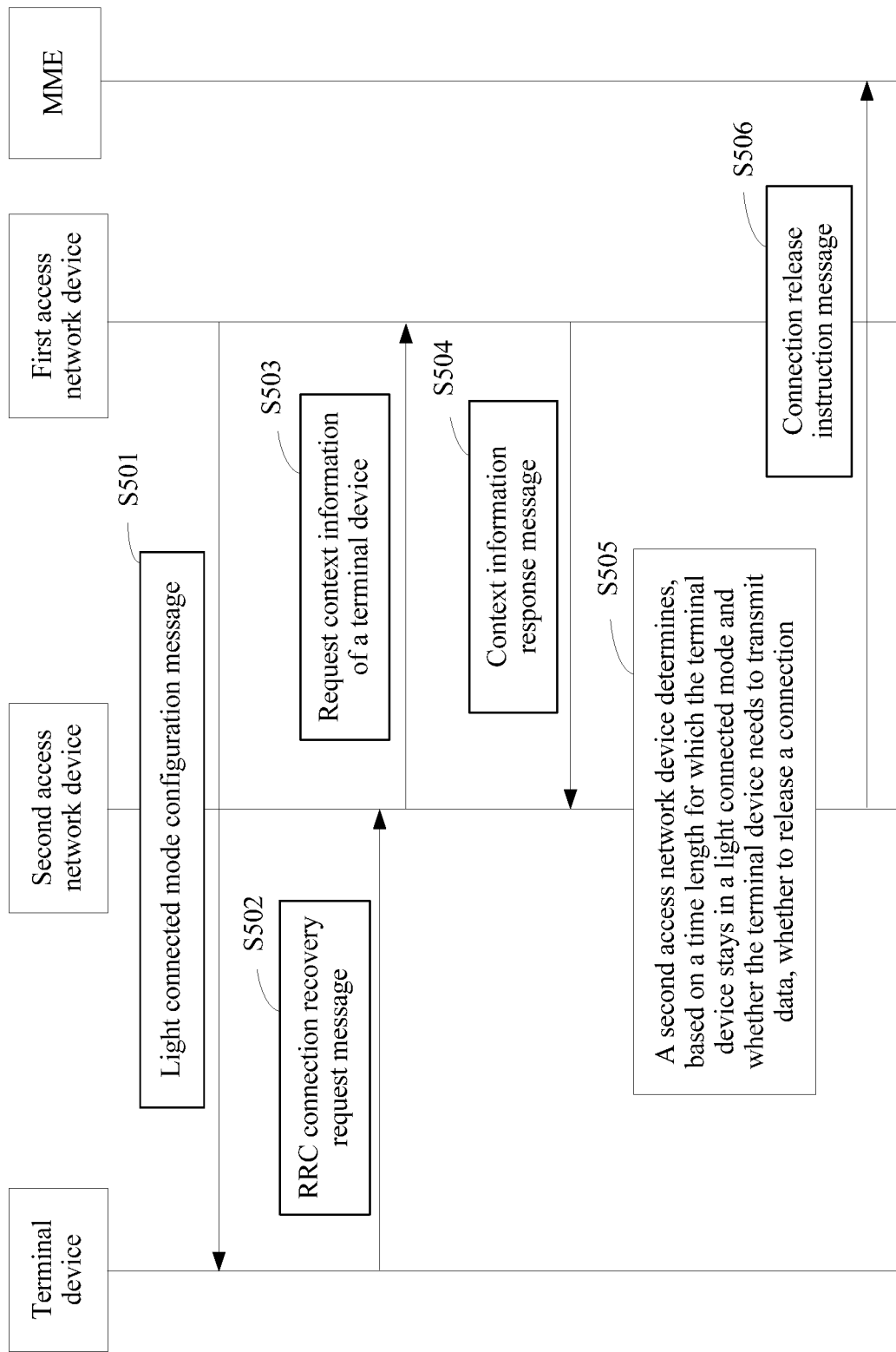
FIG. 6 is a flowchart of a connection release method according to still another embodiment of the present invention.

FIG. 6 is a flowchart of a connection release method according to still another embodiment of the present invention. As shown in FIG. 6, a first access network device in this embodiment further configures a timer for a terminal device. The method in this embodiment may include the following steps.

S501. The first access network device sends a lightly connected mode configuration message to the terminal device.

The lightly connected mode configuration message may include identification information and paging area information. For details, refer to descriptions of step 201. The lightly connected mode configuration message in this embodiment further includes the timer. The first access network device further configures the timer for the terminal device. The timer is configured to instruct the terminal device to enter an idle mode after a time length specified by the timer.

S502. The terminal device sends an RRC connection recovery request message to a second access network device.

The terminal device moves to the second access network device, and sends an access request to the second access network device.

S503. The second access network device requests context information of the terminal device from the first access network device.

Specifically, the second access network device may determine the first access network device based on identification information of the first access network device included in identification information reported by the terminal device, and send the identification information of the terminal device to the first access network device.

S504. The first access network device sends a context information response message to the second access network device.

The context information response message includes a time for which the terminal device stays in a lightly connected mode, so that the first access network device determines, based on the time, a time for which the terminal device has stayed in the lightly connected mode.

S505. The second access network device determines, based on the time for which the terminal device stays in the lightly connected mode and whether the terminal device needs to transmit data, whether to release a connection.

Specifically, if the terminal device does not need to transmit data, and a time length for which the terminal device stays in the lightly connected mode reaches a preset value, the second access network device initiates to release the connection, or if a time length for which the terminal device stays in the lightly connected mode does not reach a preset value, maintains the connection.

S506. The first access network device determines that the connection of the terminal device needs to be released, and sends a connection release instruction message to an MME.

In this embodiment, the first access network device further configures the timer for the terminal device, and releases the connection when the timer expires. When the terminal device in the lightly connected mode needs to be released, a network side does not need to recover the connection of the terminal device, and therefore the connection can be released securely and quickly.

Figure 7:
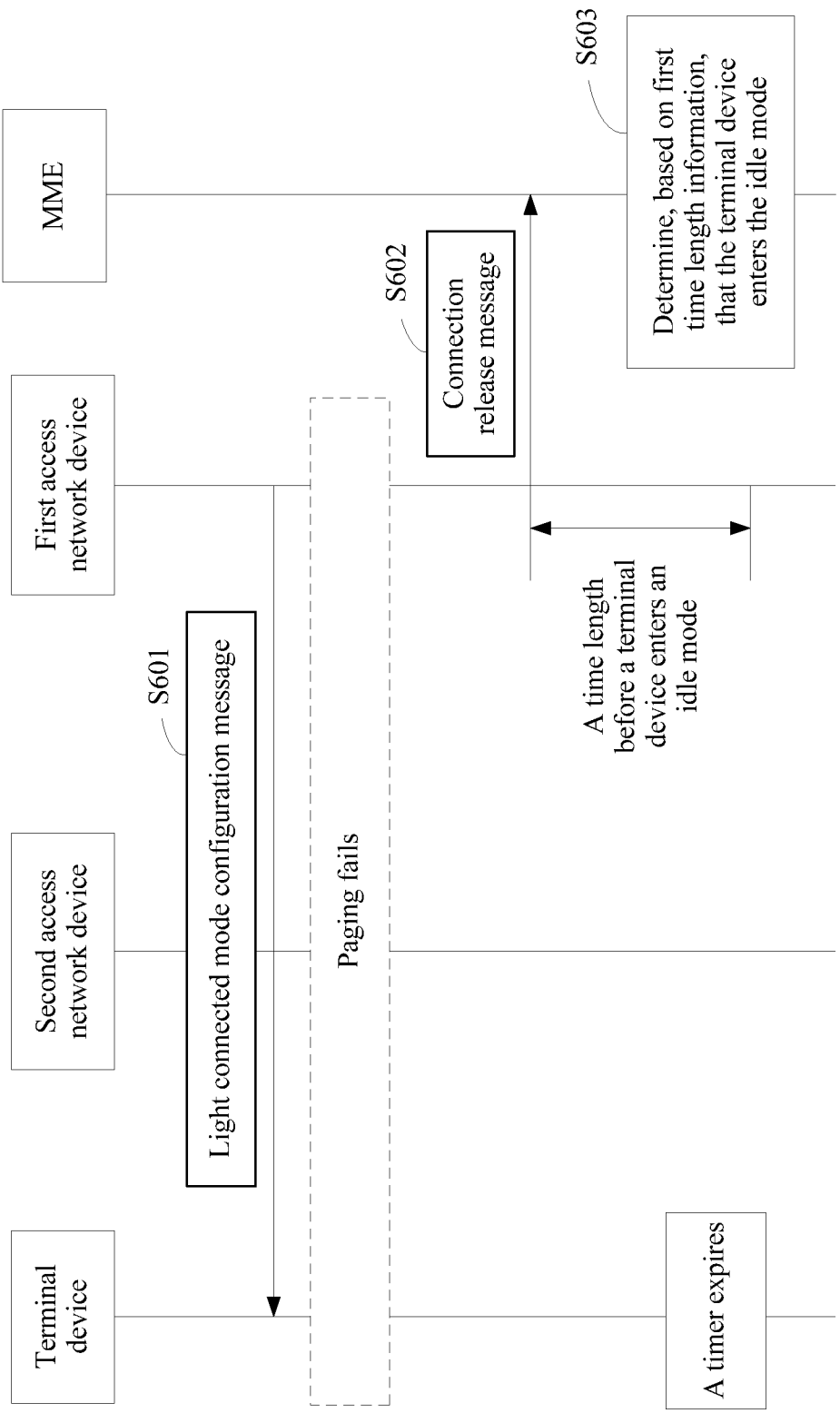
FIG. 7 is a flowchart of a connection release method according to still another embodiment of the present invention.

FIG. 7 is a flowchart of a connection release method according to still another embodiment of the present invention. As shown in FIG. 7, different from the foregoing embodiments, an application scenario of this embodiment is that a terminal device is located in a weak paging coverage area, resulting in a paging failure. The method in this embodiment may include the following steps.

S601. A first access network device sends a lightly connected mode configuration message to the terminal device.

For details of S601, refer to S501. Details are not described herein again.

The first access network device cannot determine a current specific location of the terminal device, and the first access network device needs to send, within a paging area, a paging message to the terminal device. If there is a second access network device within the paging area, the first access network device needs to send a paging message to the second access network device, so that the second access network device sends the paging message to the terminal device. However, the terminal device is located in a relatively weak coverage area at this moment, for example, in a basement, and cannot respond to paging of a network side. After the paging expires, the network side determines that the terminal device cannot be paged, and further sends a connection release message to a core network.

Because the terminal device receives no connection release message, the terminal device is still in a lightly connected mode, and the terminal device enters an idle mode until a timer configured in a first step expires.

S602. The first access network device sends a connection release message to an MME.

The connection release message carries first time length information. The first access network device needs to indicate the first time length information to the MME, and the first time length information is used to indicate a specific time length after which the terminal device enters the idle mode. A first time length is obtained by subtracting a second time length from a time length of the timer of the terminal device. The second time length is a time length from a time moment at which the terminal device enters the lightly connected mode to a time moment at which the first access network device sends the connection release message to the MME.

It can be understood that the first time length information may be carried in the connection release message and sent to the core network, or may be sent to the core network by using an individual message.

S603. The MME determines, based on the first time length information, that the terminal device enters the idle mode.

After receiving the connection release message and the first time length information, the MME determines, based on the first time length information, that the terminal device enters the idle mode after the first time length.

In this embodiment, the first access network device further configures the timer for the terminal device, and releases the connection when the timer expires. When the terminal device in the lightly connected mode needs to be released, the network side does not need to recover the connection of the terminal device, and therefore the connection can be released securely and quickly. In addition, the core network side can correctly learn of the mode of the terminal device.

Figure 8:
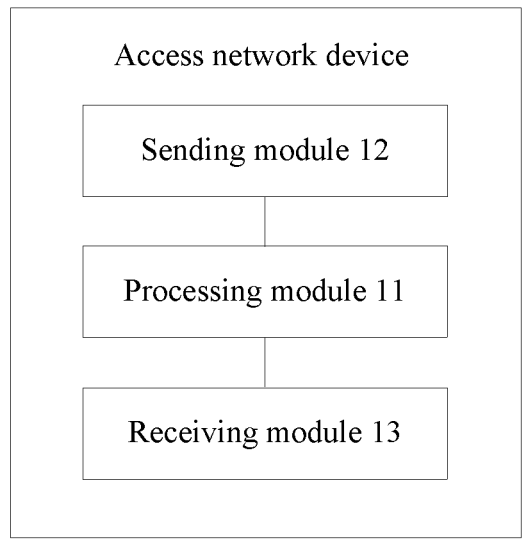
FIG. 8 is a schematic structural diagram of an access network device according to an embodiment of the present invention.

FIG. 8 is a schematic structural diagram of an access network device according to an embodiment of the present invention. As shown in FIG. 8, the apparatus in this embodiment may include a processing module 11 and a sending module 12. The processing module 11 is configured to generate a first message, where the first message includes connection release information for a terminal device and verification information, the verification information is used to verify whether the connection release information is valid, and the connection release information is used to instruct the terminal device to release a connection. The sending module 12 is configured to send the first message to a second access network device.

Optionally, the sending module 12 is further configured to send a lightly connected mode configuration message to the terminal device, where the lightly connected mode configuration message includes identification information and paging area information, and the identification information includes identification information of the terminal device and identification information of the first access network device.

Optionally, the access network device may further include a receiving module 13. The receiving module 13 is configured to receive a context information request message sent by the second access network device. The sending module 12 is specifically configured to send a context information response message to the second access network device, where the context information response message includes the connection release information and the verification information.

Optionally, the first message further includes feedback indication information, and the feedback indication information is used to instruct the terminal device to feedback, to the second access network device, whether the connection release information is received.

Optionally, the sending module 12 is specifically configured to send a paging message to the second access network device, where the paging message includes the connection release information and the verification information.

The apparatus in this embodiment can be configured to execute the technical solutions of the method embodiments in FIG. 2 to FIG. 4, FIG. 6, and FIG. 7. Implementation principles and technical effects thereof are similar, and details are not described herein again.

Figure 9:
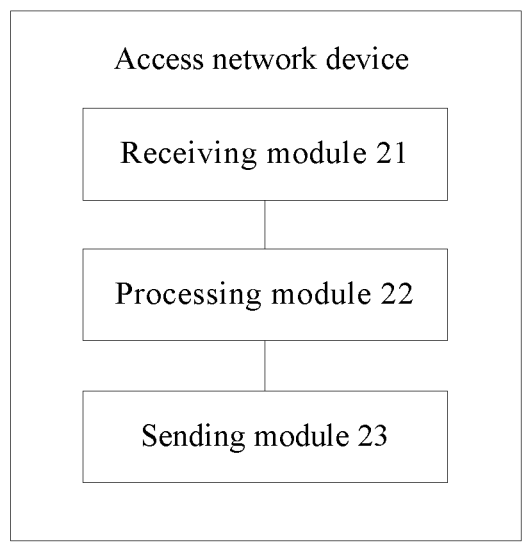
FIG. 9 is a schematic structural diagram of an access network device according to another embodiment of the present invention.

FIG. 9 is a schematic structural diagram of an access network device according to another embodiment of the present invention. As shown in FIG. 9, the apparatus in this embodiment may include a receiving module 21, a processing module 22, and a sending module 23. The receiving module 21 is configured to receive a first message sent by a first access network device. The processing module 22 is configured to generate a second message, where the second message includes connection release information for a terminal device and verification information, the verification information is configured to verify whether the connection release information is valid, and the connection release information is used to instruct the terminal device to release a connection. The sending module 23 is configured to send the second message to the terminal device.

Optionally, the receiving module 21 is further configured to receive a radio resource control RRC connection recovery request message sent by the terminal device. The processing module 22 is further configured to send, based on the RRC connection recovery request message, a context information request message to the first access network device by using the sending module 23. The receiving module 21 is specifically configured to: receive a context information response message sent by the first access network device, where the context information response message includes the connection release information and the verification information.

Optionally, the second message further includes feedback indication information, and the feedback indication information is used to instruct the terminal device to feedback whether the connection release information is received.

Optionally, the sending module 23 is specifically configured to send a paging message to the terminal device, where the paging message includes the connection release information, the verification information, and the feedback indication information.

The apparatus in this embodiment can be configured to execute the technical solutions of the method embodiments in FIG. 2 to FIG. 4, FIG. 6, and FIG. 7. Implementation principles and technical effects thereof are similar, and details are not described herein again.

Figure 10:
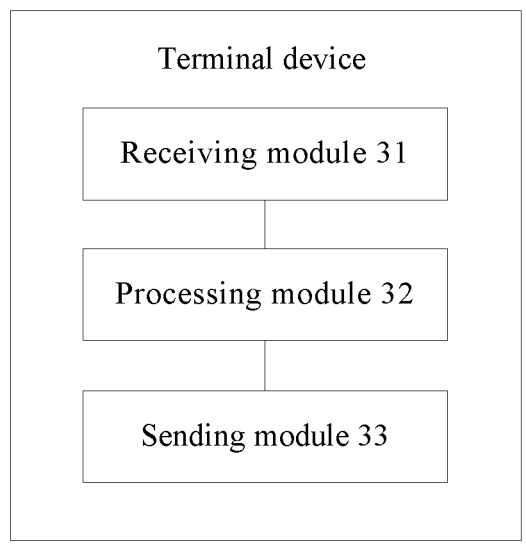
FIG. 10 is a schematic structural diagram of a terminal device according to an embodiment of the present invention.

FIG. 10 is a schematic structural diagram of a terminal device according to an embodiment of the present invention. As shown in FIG. 10, the apparatus in this embodiment may include a receiving module 31 and a processing module 32. The receiving module 31 is configured to receive a second message sent by a second access network device, where the second message includes connection release information for the terminal device and verification information, the verification information is used to verify whether the connection release information is valid, and the connection release information is used to instruct the terminal device to release a connection. The processing module 32 is configured to determine, based on the verification information, whether the connection release information is valid.

Optionally, the processing module 32 is further configured to: if the connection release information is valid, release the connection.

Optionally, the second message further includes feedback indication information, and the processing module 32 is further configured to feedback, to the second access network device based on the feedback indication information by using the sending module 33, whether the connection release information is received.

Optionally, the receiving module 31 is specifically configured to receive a paging message sent by the second access network device, where the paging message includes the connection release information and the verification information.

The apparatus in this embodiment can be configured to execute the technical solutions of the method embodiments in FIG. 2 to FIG. 4, FIG. 6, and FIG. 7. Implementation principles and technical effects thereof are similar, and details are not described herein again.

An access network device in still another embodiment of the present invention can quickly release a connection. A specific schematic structural diagram of the access network device is the same as the structural diagram shown in FIG. 8. For details, refer to FIG. 8. In a process of quickly releasing the connection by the access network device in this embodiment, a processing module 11 is configured to generate a first message, where the first message includes connection release information for a terminal device and feedback indication information, the feedback indication information is used to instruct the terminal device to feedback, to a second access network device, whether the connection release information is received, and the connection release information is used to instruct the terminal device to release the connection; and a sending module 12 is configured to send the first message to the second access network device.

Optionally, the first message further includes verification information, and the verification information is used to verify whether the connection release information is valid.

The apparatus in this embodiment can be configured to execute the technical solution of the method embodiment shown in FIG. 5. Implementation principles and technical effects thereof are similar, and details are not described herein again.

An access network device in still another embodiment of the present invention can quickly release a connection. A specific schematic structural diagram of the access network device is the same as the structural diagram shown in FIG. 9. For details, refer to FIG. 9. In a process of quickly releasing the connection by the access network device in this embodiment, a receiving module 21 is configured to receive a first message sent by a first access network device; a processing module 22 is configured to generate a second message, where the second message includes connection release information for a terminal device and feedback indication information, the feedback indication information is used to instruct the terminal device to feedback, to the access network device, whether the connection release information is received, and the connection release information is used to instruct the terminal device to release the connection; and a sending module 23 is configured to send the second message to the terminal device.

Optionally, the first message further includes verification information, and the verification information is used to verify whether the connection release information is valid.

The apparatus in this embodiment can be configured to execute the technical solution of the method embodiment shown in FIG. 5. Implementation principles and technical effects thereof are similar, and details are not described herein again.

A terminal device in still another embodiment of the present invention can quickly release a connection. A specific schematic structural diagram of the terminal device is the same as the structural diagram shown in FIG. 10. For details, refer to FIG. 10. In a process of quickly releasing the connection by the terminal device in this embodiment, a receiving module 31 is configured to receive a second message sent by a second access network device, where the second message includes connection release information for a terminal device and feedback indication information; and a processing module 32 is configured to feedback, to the second access network device based on the feedback indication information by using the sending module 33, whether the connection release information is received.

Optionally, the receiving module 31 is specifically configured to receive a paging message sent by the second access network device, where the paging message includes the connection release information and the feedback indication information.

The apparatus in this embodiment can be configured to execute the technical solution of the method embodiment shown in FIG. 5. Implementation principles and technical effects thereof are similar, and details are not described herein again.

It should be noted that, the receiving module 13 in the embodiments of the present invention may be corresponding to a receiver of the access network device or may be corresponding to a transceiver of the access network device. The sending module 12 may be corresponding to a transmitter of the access network device or may be corresponding to the transceiver of the access network device. The processing module 11 may be corresponding to a processor of the access network device. The processor herein may be a central processing unit (CPU), or an application-specific integrated circuit (ASIC), or one or more integrated circuits implementing the embodiments of the present invention. The access network device may further include a memory. The memory is configured to store instruction code. The processor invokes the instruction code from the memory, to control the receiving module 13 and the sending module 12 in the embodiments of the present invention to perform the foregoing operations.

The sending module 23 in the embodiments of the present invention may be corresponding to a transmitter of the access network device or may be corresponding to a transceiver of the access network device. The receiving module 21 may be corresponding to a receiver of the access network device or may be corresponding to the transceiver of the access network device. The processing module 22 may be corresponding to a processor of the access network device. The processor herein may be a CPU, or an ASIC, or one or more integrated circuits implementing the embodiments of the present invention. The access network device may further include a memory. The memory is configured to store instruction code. The processor invokes the instruction code from the memory, to control the sending module 23 and the receiving module 21 in the embodiments of the present invention to perform the foregoing operations.

The sending module 33 in the embodiments of the present invention may be corresponding to a transmitter of the terminal device or may be corresponding to a transceiver of the terminal device. The receiving module 31 may be corresponding to a receiver of the terminal device or may be corresponding to the transceiver of the terminal device. The processing module 32 may be corresponding to a processor of the terminal device. The processor herein may be a CPU, or an ASIC, or one or more integrated circuits implementing the embodiments of the present invention. The terminal device may further include a memory. The memory is configured to store instruction code. The processor invokes the instruction code from the memory, to control the sending module 33 and the receiving module 31 in the embodiments of the present invention to perform the foregoing operations.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

It may be clearly understood by a person skilled in the art that, for ease of convenience and brevity, division of the foregoing function modules is merely taken as an example for illustration. In actual application, the foregoing functions can be allocated to different function modules and implemented as required, that is, an inner structure of an apparatus is divided into different function modules to implement all or some of the functions described above. For a detailed working process of the foregoing apparatus, refer to a corresponding process in the foregoing method embodiments. Details are not described herein again.

What is claimed is:

1. A connection release method, comprising:
receiving, by a first access network device, a context information request message from a second access network device;
in response to the context information request message, generating, by the first access network device, a context information response message, wherein the context information response message comprises connection release information for a terminal device and verification information, the verification information is used to verify whether the connection release information is valid, and the connection release information indicates the terminal device to release a connection;
sending, by the first access network device, the context information response message to the second access network device;
after sending the context information response message, releasing, by the first access network device, context information of the terminal device;
in response to the context information response message, generating, by the second access network device, a second message, wherein the second message comprises the connection release information and the verification information; and sending, by the second access network device, the second message to the terminal device.

2. The method according to claim 1, wherein the method further comprises:

sending, by the first access network device, a lightly connected mode configuration message to the terminal device, the lightly connected mode configuration message comprising identification information and paging area information, and the identification information comprising identification information of the terminal device and identification information of the first access network device.

3. The method according to claim 1, wherein the context information response message further comprises feedback indication information, and the feedback indication information is used to instruct the terminal device to feedback, to the second access network device, whether the connection release information is received.

4. A communication system, comprising:

a first apparatus, comprising:
  a first non-transitory memory storing executable instructions; and
  a first processor configured to execute the executable instructions to perform operations comprising:
    receiving a context information request message from a second apparatus;
    generating a context information response message, wherein the context information response message comprises connection release information for a terminal device and verification information, the verification information is used to verify whether the connection release information is valid, and the connection release information indicates the terminal device to release a connection;
    sending the context information response message to the second apparatus;
    after sending the context information response message, releasing context information of the terminal device; and the second apparatus, comprising:
  a second non-transitory memory storing executable instructions; and
  a second processor configured to execute the executable instructions to perform operations comprising:
    sending the context information request message to the first apparatus;
    receiving the context information response message from the first apparatus;
    in response to the context information response message, generating a second message, wherein the second message comprises the connection release information and the verification information; and
    sending the second message to the terminal device.

5. The communication system according to claim 4, wherein the operations of the first apparatus further comprise:

sending a lightly connected mode configuration message to the terminal device, wherein the lightly connected mode configuration message comprises identification information and paging area information, and the identification information comprises identification information of the terminal device and identification information of the first apparatus.

6. The communication system according to claim 4, wherein the context information response message further comprises feedback indication information, and the feedback indication information is used to instruct the terminal device to send, to the second apparatus, information indicating whether the connection release information is received.

7. The communication system according to claim 4, wherein the operations of the second apparatus further comprise:

receiving a radio resource control (RRC) connection recovery request message from the terminal device; and
sending the context information request message to the first apparatus in response to the RRC connection recovery request message.

8. The communication system according to claim 4, wherein the second message further comprises feedback indication information, and the feedback indication information is used to instruct the terminal device to send information indicating whether the connection release information is received.

* * * * *